(12) United States Patent
Paquette et al.

(10) Patent No.: US 7,301,122 B2
(45) Date of Patent: Nov. 27, 2007

(54) INLINE SPARK GAP ASSEMBLY

(75) Inventors: Justin L Paquette, Manton, MI (US); Jeffery J Gadamus, Hortonville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 122 days.

(21) Appl. No.: 10/907,522

(22) Filed: Apr. 4, 2005

(65) Prior Publication Data

US 2006/0219680 A1  Oct. 5, 2006

(51) Int. Cl.
*B23K 9/067* (2006.01)
(52) U.S. Cl. .................... 219/130.4; 313/604
(58) Field of Classification Search ............ 219/130.4; 313/245, 604, 621; 331/127; 361/130
See application file for complete search history.

(56) References Cited

U.S. PATENT DOCUMENTS

| | | | | |
|---|---|---|---|---|
| 1,171,598 A | * | 2/1916 | De Forest | ............... 313/604 |
| 2,300,101 A | * | 10/1942 | Capita | ............... 315/177 |
| 2,516,037 A | * | 7/1950 | Williams | ............. 219/130.4 |
| 2,867,730 A | * | 1/1959 | Welch | ............. 219/130.4 |
| 4,797,778 A | * | 1/1989 | Boy | ............... 361/130 |
| 6,075,224 A | | 6/2000 | De Coster | |
| 6,337,789 B1 | | 1/2002 | Achtner | |
| 6,384,374 B1 | | 5/2002 | Colling et al. | |

\* cited by examiner

*Primary Examiner*—Clifford C. Shaw
(74) *Attorney, Agent, or Firm*—Ziolkowski Patent Solutions Group, SC (57) ABSTRACT

A spark gap point and spark gap assembly for a welding-type device are disclosed for igniting and stabilizing a welding-type arc. A double-headed spark gap point having spark gap surfaces on two ends is incorporated into a spark gap assembly with a pair of single-headed spark gap points that each have only a single spark gap surface. All spark gap points are arranged coaxially on a base so that each spark gap surface faces another spark gap surface. A spark gap is created between each set of opposing spark gap surfaces. When a high voltage is applied across the spark gap points, sparks periodically arc across the spark gaps, creating a high frequency, high voltage signal usable to ignite or stabilize a welding-type arc.

22 Claims, 3 Drawing Sheets

INLINE SPARK GAP ASSEMBLY

BACKGROUND OF THE INVENTION

The present invention relates generally to welding-type devices, and more particularly, to an assembly for igniting or stabilizing an arc of a welding-type device. Specifically, the invention is directed to a spark gap assembly of a welding-type device for arc ignition or stabilization.

In some welding-type processes, it is often desirable to employ a high frequency voltage signal in starting or maintaining an arc. In doing so, a high voltage, high frequency signal is generated and applied across an arc gap, e.g. from a torch to a workpiece. This may be done initially to establish an arc, to maintain an arc in the event of arc rectification, or continuously. Thus, an arc may be ignited or stabilized without actual contact occurring between the torch electrode and the workpiece. The use of a high voltage, high frequency signal is equally applicable for igniting both AC and DC welding arcs. In AC arc systems, arc rectification is prone to occur when the welding voltage signal from a welding-type power source cycles through a null point. In such a case, a high voltage, high frequency signal could be applied at each null point in the frequency cycle of the welding voltage signal, or as necessary to correct rectification.

One method of producing a high voltage, high frequency signal for such an application is through use of a spark gap assembly. A high voltage signal is applied to spark-inducing elements such that a spark is periodically generated across a small gap between surfaces of spark-inducing elements. A typical spark gap assembly includes a number of spark gap points held in place by various securing means. As used herein, "spark gap point" will refer to the conductive elements across which a high voltage signal is applied. Known spark gap points have a spark gap surface at only one end of the body of the spark gap point. "Spark gap surface" refers to those conductive surfaces between which a spark arcs.

Spark gap points are typically arranged such that the spark gap surface of one point faces the spark gap surface of another point. The spark gap surfaces are separated by a distance known as a spark gap. Such systems usually include one or two pairs of spark gap points, although use of more than two pairs is possible. When one pair of spark gap points is used, a single spark gap is defined between the spark gap surfaces of the points. Likewise, if two pairs of spark gap points are used, two spark gaps are defined. That is, one spark gap is created between each pair of points, and a jumper wire is used to electrically connect the two pairs. Conventional spark gap assemblies utilize pairs of spark gap points and, as such, two spark gap points are necessary to form one spark gap. Therefore, known spark gap assemblies may contain an unnecessary number of parts, and as a result, may be unnecessarily complex and costly to manufacture and assemble.

Conventional spark gap assemblies having two spark gaps, i.e. two pairs of spark gap points, are constructed so that the required four spark gap points are aligned along two separate rows. Because the spark gap points must be arranged in this manner, the size of a spark gap assembly is increased and a jumper wire is necessary to electrically connect the pairs of spark gap points. Additionally, requiring two separate rows of spark gap points in the same assembly limits the possible shapes of the assembly. And, the use of an extra wire creates an additional possibility for electrical shorts or circuit breakdown, and could vary the electrical resistance between spark gaps.

Such an assembly also presents increased construction complexity and manufacturing costs. Constructing a spark gap assembly is made more difficult when there are multiple rows of spark gap points. This is due to the precise alignment desired for spark gap points arranged along multiple axes. Precise alignment of spark gap point housings, threaded screw holes, and other securing means must be performed twice, once for each separate row of spark gap points. Furthermore, the use of more parts increases production costs. For example, jumper wires present not only added part costs, but also added construction steps since they must be soldered or otherwise electrically connected to the spark gap points.

Conventional spark gap assemblies are also prone to misalignment when in use. Under certain operating conditions, it may be expected that some components will become unfastened. This is especially significant in spark gap assemblies, where precise alignment is critical. Therefore, as more parts are used, the possibility of spark gap surface misalignment increases. In addition, the type of fastening or securing means used can affect an assembly's propensity for misalignment. Known spark gap assemblies use methods of securing spark gap points which may not be optimal. For example, when fasteners do not directly engage a spark gap point, the spark gap point may be more likely to shift within its housing.

Also, the method of applying a high voltage input signal to spark gap points can affect performance. Typical spark gap assemblies employ a method of indirectly conducting input voltage signals to spark gap points. Frequently, the high voltage input is applied to a heat sink or securing means to be conducted to the spark gap points indirectly. Performance of a spark gap assembly can be increased by applying the input voltage signal directly to the spark gap points, rather than indirectly conducting the signal through other components.

It would therefore be desirable to have spark gap points and a spark gap assembly for welding-type devices which provide spark gaps using fewer parts. In particular, it would be desirable to have a spark gap assembly constructed such that the spark gap points may be inline, rather than arranged in multiple rows. Such an arrangement would require fewer parts, reduce the expense and complexity of manufacturing, and would be less prone to misalignment. Additionally, providing for application of a high voltage signal directly to spark gap points would improve performance.

BRIEF DESCRIPTION OF THE INVENTION

The present invention provides a system and apparatus for igniting and maintaining a welding arc that overcomes the aforementioned drawbacks. The invention includes a double-headed spark gap point, having spark gap surfaces on two ends, that is arranged linearly on a base between a pair of single-headed spark gap points. Moreover, the present invention can be used in a welding-type power source for ignition and stabilization of a welding arc.

Therefore, in accordance with one aspect of the present invention, a spark gap point is disclosed as having a body having a first end and a second end. A first spark gap surface is disposed at the first end and a second spark gap surface is disposed at the second end.

In accordance with another aspect of the present invention, a spark gap assembly includes a base and a pair of single-headed spark gap points. At least one double-headed spark gap point is positioned axially between the pair of single-headed spark gap points.

According to a further aspect of the present invention, a welding-type power source is disclosed that comprises a power conditioner configured to condition a raw power into welding-type power that is useable in a welding-type process. The welding-type power source further includes a spark gap assembly having at least three spark-inducing elements linearly arranged with respect to one another along a common axis. The spark gap assembly is designed to perform at least one of arc ignition and arc stabilization.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

As one skilled in the art will fully appreciate, the hereinafter description of welding-type devices not only includes welders, but may also include any system that utilizes high power outputs, such as heating and cutting systems. Therefore, the present invention is equivalently applicable with any device requiring high power output, including welders, plasma cutters, induction heaters, and the like. References to welding, welders, welding power, welding-type power, or welding-type apparatus describe just one embodiment in which the present invention may be implemented. Understandably, the present invention is equivalently applicable with many high power systems, such as cutting and induction heating systems or any similar systems. Additionally, a person skilled in the art will further appreciate that the present invention is applicable to any such device that may be operated at a plurality of different input power signals.

Figure 1:
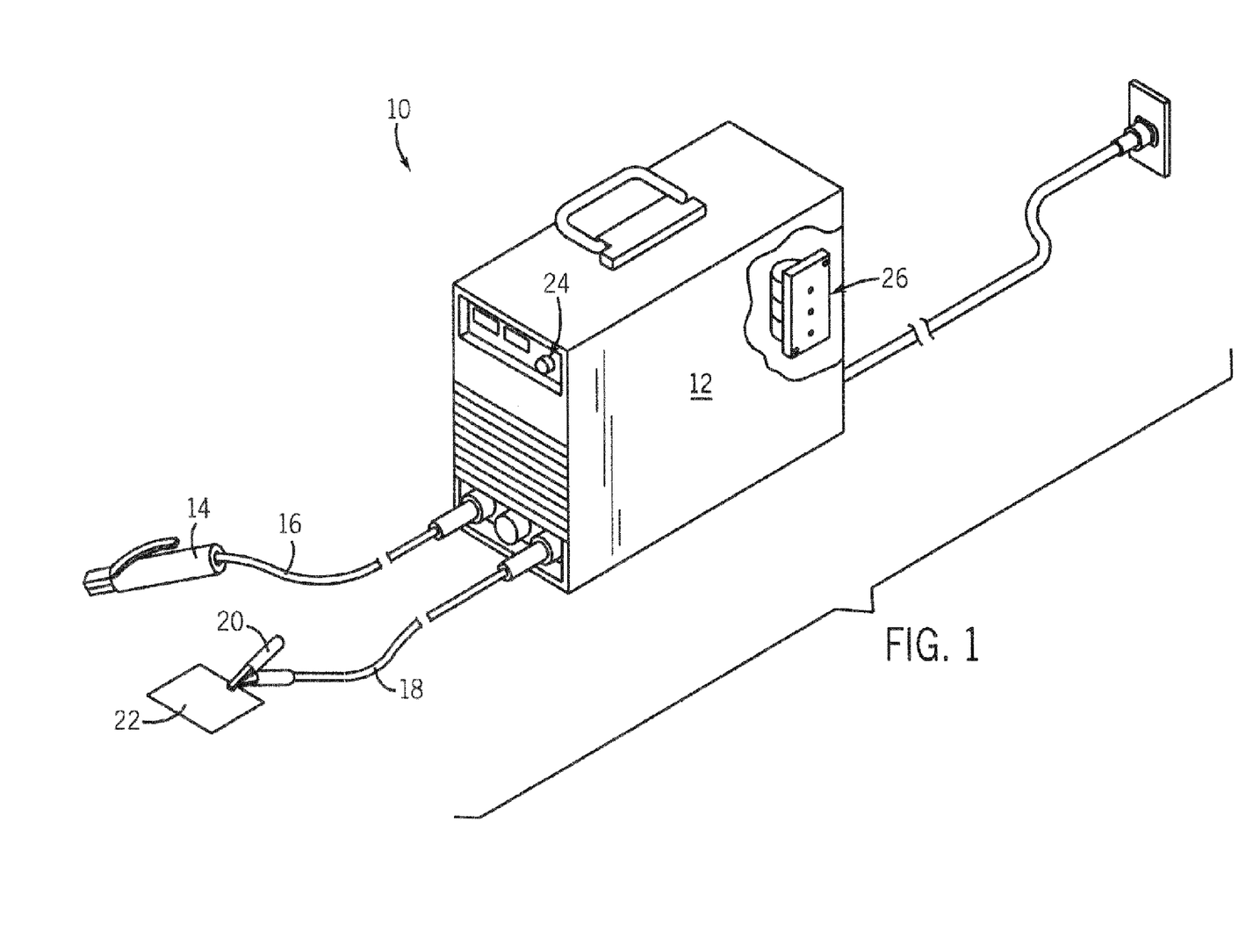
FIG. 1 is a perspective view of a welding-type system incorporating a spark gap assembly of the present invention.

Referring to FIG. 1, a welding system 10, incorporating the present invention, is shown. Welding system 10 includes a power source 12, constructed to receive an input power and generate a voltage suitable for welding. A torch 14 is operably connected to power source 12 via weld cable 16. Ground cable 18 attaches clamping member 20 to power source 12. Clamping member 20 is constructed to removably secure cable 18 to workpiece 22 so that a desired welding application may be performed. Power switch 24 controls power source 12, determining when an output voltage is generated. Spark gap assembly 26, seen in cut-away, is secured within power source 12 and is electrically connected thereto. When a user desires to begin a welding process, power source 12 is turned on via power switch 24 and torch 14 is moved proximate to workpiece 22. A high voltage is applied across spark gap assembly 26 such that sparks are periodically generated across spark gaps (not shown) creating a high voltage, high frequency signal. The high voltage, high frequency signal is added to the output voltage signal generated by power source 12 so that an arc is ignited between torch 14 and workpiece 22. In addition, if the arc is rectified, a high frequency high voltage signal may again be applied across spark gap assembly 26 for reignition or stabilization of the arc.

Figure 2:
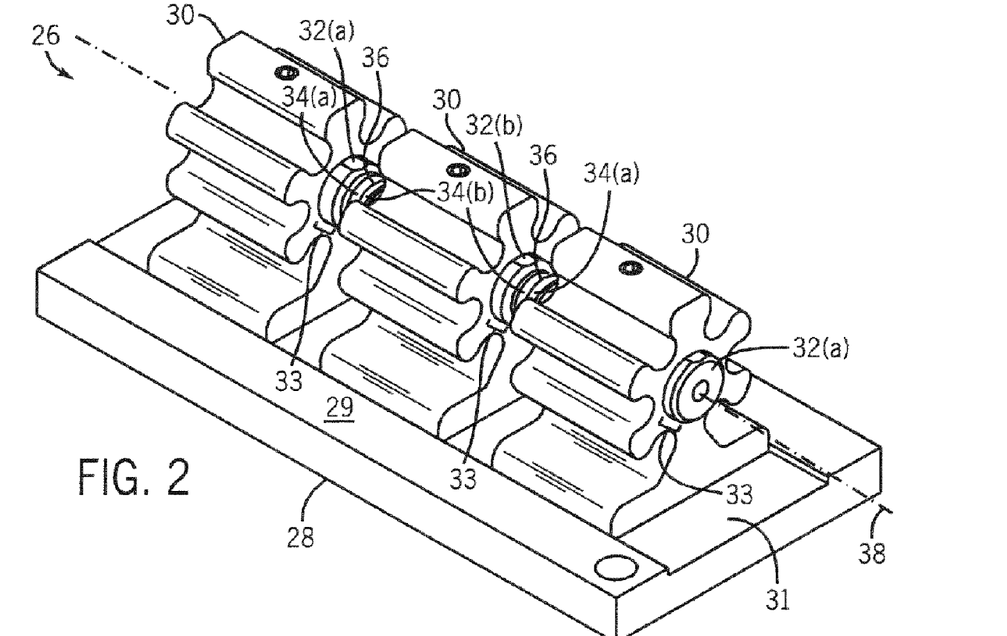
FIG. 2 is a perspective view of a spark gap assembly in accordance with one embodiment of the present invention.

Referring now to FIG. 2, spark gap assembly 26, according to the present invention, is shown. Spark gap assembly 26 has a base 28, a number of securing members 30, and a number of spark gap points 32. Base 28 is shown as rectangular and having a substantially planar top surface 29. Securing members 30 are affixed to top surface 29 of base 28, and extend generally perpendicular therefrom. Securing members 30 are substantially aligned with one another along axis 38 of base 28. In one embodiment, a groove 31 is formed in top surface 29 of base 28 so that securing members 30 fit snugly therein to prevent shifting.

Securing members 30 and spark gap points 32 are arranged so that spark gaps 36 are formed between heads 34. In the illustrated embodiment, the two outer spark gap points 32(a) each have a single spark gap head 34(a). Disposed linearly between spark gap points 32(a) is one double-headed spark gap point 32(b). This double-headed spark gap point 32(b) has two heads 34(b). Spark gap points 32 are disposed within securing members 30 such that each spark gap head 34 faces a spark gap head of another spark gap point 32. Each spark gap point 32 extends a length 33 beyond its corresponding securing member 30 along axis 38 on two opposite sides of the securing member 30. As a result, the heads 34 of each spark gap point can be seen extending beyond securing members 30. While one double-headed spark gap point is shown, it is contemplated that multiple double-headed spark gap points may be linearly positioned between single-headed spark gap points 32(a).

As shown, securing members 30 are aligned along axis 38 of base 28, and are spaced apart by distances which accommodate the creation of desired spark gaps 36. Thus, spark gap points 32 are also arranged linearly along axis 38 so that spark gap heads 34 are aligned with one another. Accordingly, when a high voltage signal is applied across spark gap points 32, sparks periodically arc from a spark gap surface 34 across a spark gap 36 to another spark gap surface 34 producing a high voltage, high frequency output.

Figures 3, 6:
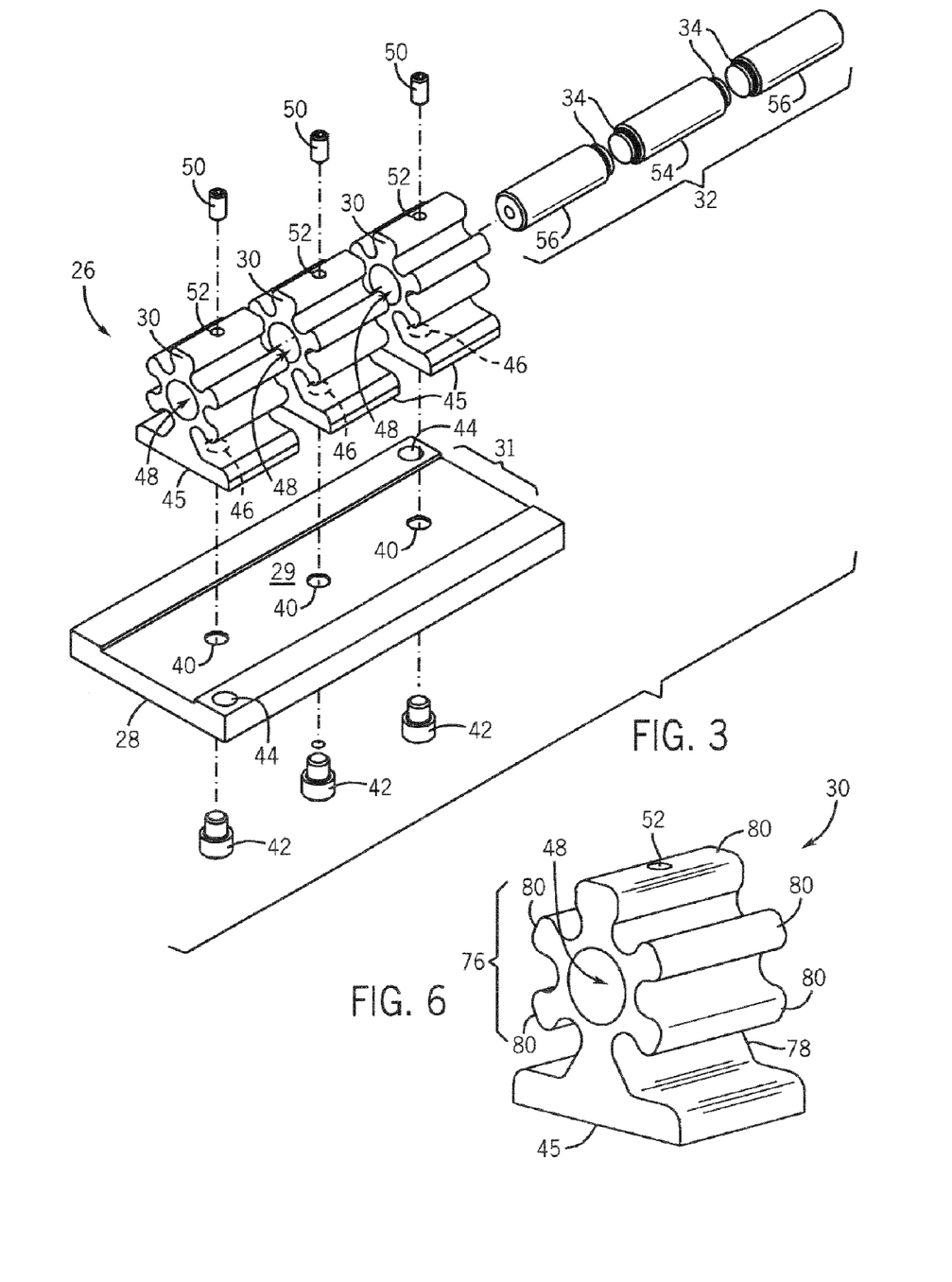
FIG. 3 is an exploded view of the spark gap assembly of FIG. 2.
FIG. 6 is a perspective view of a securing member in accordance with one embodiment of the present invention.

Referring now to FIG. 3, an exploded view of the spark gap assembly 26 shown in FIG. 2 is illustrated. Base 28 is generally flat and rectangular, however it is understood that other shapes are suitable. For example, the desired shape of base 28 may depend upon where the spark gap assembly 26 will be used. Also, in a preferred embodiment base 28 is made of fiberglass, although other suitable materials, such as plastic, are contemplated. Base 28 has securing holes 40 through which bolts, or securing screws 42, may pass to affix securing members 30 to top surface 29 of base 28. Securing holes 40 are preferably counter-sunk on the bottom side (not shown) of base 28 to reduce the possibility of electrical shorts between securing screws 42 and various interior components of a welding-type power source. The separation between securing holes 40 depends upon the widths of the securing members 30 and spark gap points 32, and upon the desired spark gap width. Groove 31 is again shown on top surface 29 of base 28. Alternatively, base 28 could have raised ledges or bosses to prevent rotation or misalignment of securing members 30, when attached. Mounting holes 44 are formed through base 28 so that spark gap assembly 26 may be attached to, for example, the housing of a welding-type power source.

Securing members 30 are shown having a generally flat bottom surface 45 which abuts top surface 29 of base 28. Thread holes 46 are formed on the bottom of securing members 30 to receive securing screws 42 through base 28 for attaching securing members 30 to base 28. Securing members 30 also have slots, or receptacles 48, for snugly housing spark gap points 32. Once inserted into securing members 30, spark gap points 32 are held in place by set screws 50. Set screws 50 are threaded through set screw holes 52 to directly engage spark gap points 32 and fixedly maintain spark gap points 32 in place. When attached to base 28, securing members 30 are aligned axially so that spark gap heads face one another precisely. The gap 36 (not shown) between a pair of spark gap heads 34 should be substantially the same distance as between all corresponding points on the surfaces of the two heads 34. The spark gap points 32 are held in alignment by securing members 30 so that the surfaces of spark gap heads 34 are all substantially parallel. The width of spark gaps 36 (not shown) may be adjusted by loosening set screws 50 and sliding spark gap points 32 a desired distance through securing members 30.

As shown, one spark gap point 54 has two spark gap heads 34, and two spark gap points 56 each have a single spark gap head 34. Therefore, when single-headed spark gap points 56 are secured on opposite axial ends of double-headed spark gap point 54 by securing members 30, two spark gaps 36 (not shown) can be formed from three spark gap points 32. That is, single-headed spark gap points 56 are inserted into the outer two securing members 30 and double-headed spark gap point 54 is inserted into the center securing member 30 so that all three spark gap points 32 are arranged coaxially. Then, the spark gap head 34 of each single-headed spark gap point 56 will be proximate to and complement one of the spark gap heads 34 of double-headed spark gap point 54 to form two spark gaps 36 (not shown). It is appreciated, however, that any desired number of double-headed spark gap points 54 could be disposed between the outer single-headed spark gap points 56.

Figure 4:
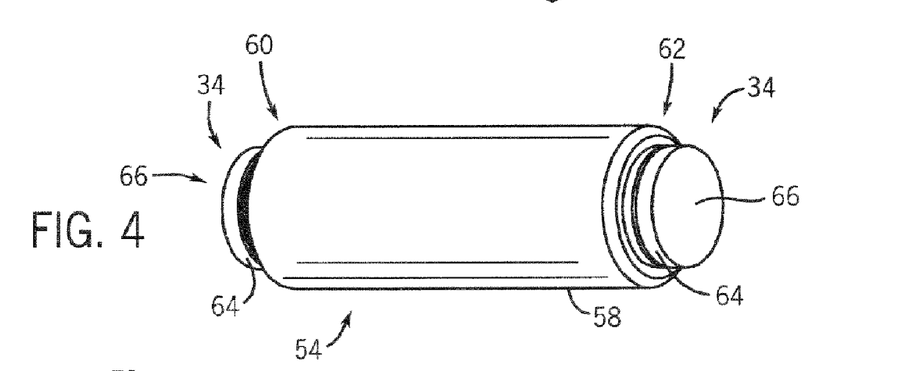
FIG. 4 is a perspective view of a double-headed spark gap point in accordance with one embodiment of the present invention.

Referring now to FIG. 4, a double-headed spark gap point 54 is constructed to have a generally cylindrical body 58 with two ends 60, 62. Body 58 is preferably formed of steel, but it is understood that other materials may also be suitable. At ends 60, 62, spark gap heads 34 are disposed, each comprising an electrode 64 having a face or spark gap surface 66. Spark gap heads 34 are also shown as cylindrical and have a diameter less than that of body 58. Spark gap surfaces 66 are generally flat and circular, and are configured to complement the spark gap surface 66 of another spark gap point (not shown). Spark gap heads 34 are preferably formed of tungsten, and may comprise solid bodies or caps surrounding a protrusion of body 58. In any event, it is understood that other complementary shapes and conductive materials may be suitable for spark gap heads 34.

Figure 5:
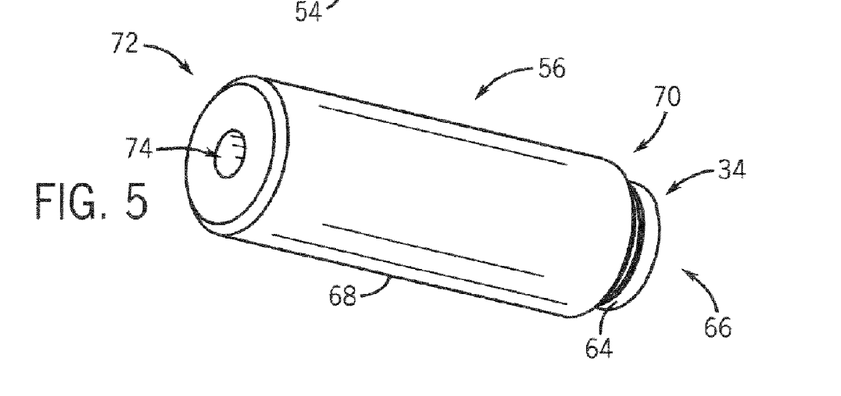
FIG. 5 is a perspective view of a single-headed spark gap point in accordance with one embodiment of the present invention.

A single-headed spark gap point 56 is shown in FIG. 5. Body 68 of single-headed spark gap point 56 is similar to body 58 of double-headed spark gap point 54, being generally cylindrical and preferably formed of steel. At a first end 70 of single-headed spark gap point 56, a spark gap head 34 is disposed. Spark gap head 34 is comprised of an electrode 64 and face or spark gap surface 66. Head 34 is constructed to complement a head of another spark gap point, such as a spark gap head 34 of double-headed spark gap point 54. At the second end 72 of single-headed spark gap point 56, a bore or connection point 74 is formed. No spark gap head is disposed at second end 72. In operation, connection point 74 is used for direct connectivity to a high voltage input signal.

Referring now to FIG. 6, a securing member 30 of FIG. 3 is shown in detail. Securing member 30 is comprised of a flat bottom surface 45 and receptacle portion 76 connected by a stem 78. In one embodiment, securing member 30 may be a heat sink. Therefore, receptacle portion 76 may have protrusions or ribs 80 to maximize surface area for heat dissipation. A slot or receptacle 48 is formed through receptacle portion 76 to house a spark gap point 32 (not shown). A threaded set screw hole 52 is formed atop receptacle portion 76 to receive a set screw 50 so that a spark gap point 32 (not shown) may be firmly held in place in receptacle 48. Securing member 30 and set screw 50 are preferably formed of a nonconductive material so that an input voltage applied at a connection point 74 of a single-headed spark gap point 56 (not shown) is not conducted through securing member 30 and set screw 50. Additionally, securing members 30 could have raised ledges or bosses (not shown) to prevent a spark gap point 32 from sliding out of receptacle 48 in the event that a set screw 50 became loose.

Alternatively, receptacle portion 76 of securing member 30 could be "C" shaped. In such an embodiment, a set screw 50 would be used to clamp down the open side of securing member 30 and enclose the receptacle 48 tightly about a spark gap point 32. Or, the securing member 30 could be comprised of two clamping portions. In such an embodiment, a spark gap point 32 would rest in a groove of a first portion attached to base 28. A complementing second portion would then be securely fastened to the first portion, tightly holding spark gap point 32 therebetween.

Accordingly, it has been shown that the present invention provides for a more efficient, less expensive, and less complex spark gap assembly. A spark gap point having spark gap surfaces on two ends allows for all spark gaps to be inline, and reduces the number of points needed per spark gap. Further, directly applying a high voltage input to spark gap points, rather than indirectly through a heat sink or set screw, improves performance of the spark gap assembly.

Therefore, a spark gap point is provided having a body with a first end and a second end. A first spark gap surface is disposed at the first end and a second spark gap surface is disposed at the second end.

The invention also includes a spark gap assembly comprising a base and a pair of single-headed spark gap points. At least one double-headed spark gap point is positioned axially between the pair of single-headed spark gap points.

According to a further aspect of the present invention, a welding-type power source includes a power conditioner configured to condition a raw power into welding-type power that is useable in a welding-type process. The welding-type power source further includes a spark gap assembly having at least three spark-inducing elements linearly arranged with respect to one another along a common axis. The spark gap assembly is designed to perform at least one of arc ignition and arc stabilization.

The present invention has been described in terms of the preferred embodiment, and it is recognized that equivalents, alternatives, and modifications, aside from those expressly stated, are possible and within the scope of the appending claims.

What is claimed is:
1. A spark gap point comprising:
   a body having a first end and a second end; and
   a first spark gap surface disposed at the first end and a second spark gap surface disposed at the second end.

2. The spark gap point of claim 1 wherein each of the first and the second spark gap surfaces are formed to match a complementary spark gap surface of another spark gap point to create a desired spark gap therebetween.

3. The spark gap point of claim 2 wherein each of the first and the second spark gap surfaces are generally planar and secured to the body so as to be substantially perpendicular to a longitudinal axis of the body.

4. The spark gap point of claim 1 wherein each of the first and the second spark gap surfaces include an electrode.

5. The spark gap point of claim 4 wherein each electrode is formed of at least tungsten.

6. The spark gap point of claim 1 wherein the body is generally cylindrical in shape and formed of steel.

7. A spark gap assembly comprising:
a base; and
a pair of single-headed spark gap points and at least one double-headed spark gap point positioned axially between the pair of single-headed spark gap points.

8. The spark gap assembly of claim 7 further comprising at least one securing member configured to secure the pair of single-headed and the at least one double-headed spark gap points to the base.

9. The spark gap assembly of claim 7 wherein a spark gap head of each single-headed spark gap point is constructed to be separated from a spark gap head of a double-headed spark gap point to form a desired spark gap therebetween.

10. The spark gap assembly of claim 7 wherein each spark gap point is defined by a generally cylindrical shaped body, and wherein each of the pair of single-headed spark gap points has a tungsten electrode at one end of the body and wherein the at least one double-headed spark gap point has a tungsten electrode at both ends of the body.

11. The spark gap assembly of claim 7 wherein the pair of single-headed spark gap points is configured to directly receive an input power signal.

12. The spark gap assembly of claim 7 further comprising at least one heat sink configured to thermally regulate the pair of single-headed and the at least one double-headed spark gap points.

13. The spark gap assembly of claim 7 comprising one double-headed spark gap point linearly arranged with the pair of single-headed spark gap points.

14. A welding-type power source comprising:
a power conditioner configured to condition a raw power into welding-type power, useable in a welding-type process;
a spark gap assembly having at least three spark-inducing elements linearly arranged with respect to one another along a common axis and constructed to be air-cooled, the spark gap assembly designed to perform at least one of arc ignition and arc stabilization; and
wherein each spark-inducing element of the spark gap assembly is individually surrounded by a respective mounting member.

15. The welding-type power supply of claim 14 wherein the spark gap assembly includes at least one heat sink configured to thermally regulate the at least three spark-inducing elements and secure the at least three spark-inducing elements to a base.

16. The welding-type power supply of claim 15 wherein the at least one heat sink includes at least one of a clamp, retaining screws, and bosses to maintain the spark inducing elements in position.

17. The welding-type power supply of claim 14 wherein two of the spark-inducing elements have a single tungsten electrode and at least one spark-inducing element has a pair of tungsten electrodes.

18. The welding-type power supply of claim 14 wherein the at least three spark-inducing elements are arranged to form at least two desired spark gaps.

19. The welding-type power supply of claim 14 wherein the spark gap assembly includes two leads, each directly connected to a spark gap point and designed to energize the spark gap points.

20. The welding-type power supply of claim 14 further comprising a high frequency starter having the spark gap assembly integrated therewith.

21. A welding-type apparatus comprising:
a power source configured to deliver a welding-type power to a torch;
a spark gap assembly having at least one double-headed spark gap point connected to a heat sink, the at least one double-headed spark gap point having:
a cylindrical body substantially free of openings and protrusions and having a longest axis;
two spark gap heads at opposing ends of the longest axis, the spark gap heads comprising endcaps; and
wherein the spark gap assembly is connected to the power source to stabilize an arc between the torch and a workpiece.

22. A spark gap assembly comprising:
a base;
at least three axially aligned heat sinks mounted to the base and having a centrally located receptacle in each heat sink;
at least three spark gap points, one spark gap point positioned in each heat sink receptacle and held in place by set screws directly engaging the spark gap points; and
wherein two of the at least three spark gap points have bores in outer ends for receiving inputs.

* * * * *

UNITED STATES PATENT AND TRADEMARK OFFICE
CERTIFICATE OF CORRECTION

PATENT NO. : 7,301,122 B2
APPLICATION NO. : 10/907522
DATED : November 27, 2007
INVENTOR(S) : Paquette et al.

It is certified that error appears in the above-identified patent and that said Letters Patent is hereby corrected as shown below:

Col. 6, (Claim 1), delete "a body having a first end and a second end;" and substitute therefore -- a body having a first end, a second end, and a longest axis therebetween, the body being free of apertures; and --;

Col. 7, Line 4 (Claim 2), before the period, insert -- , the desired spark gap defining a distance for sparking without aid of a gas fill. --;

Col. 7, line 8, (Claim 3), delete "a longitudinal" and substitute therefore -- the longest --;

Col. 7, line 16, (Claim 7), after "a base;" delete "and";

Col. 7, line 19, (Claim 7), before the period, insert -- ; and wherein the pair of single-headed spark gap points each have an oppositely opposing end having a bore therein, the bore configured to directly receive a power input thereto. --;

Col. 7, lines 21 through 23, delete Claim 8 in its entirety and substitute therefore -- 8. The spark gap assembly of claim 7 further comprising a securing member configured to individually secure the at least one double-headed spark gap points to the base and to align electrodes of the at least one double-headed spark gap point with electrodes of the pair of single-headed spark gap points. --;

Col. 7, line 27, (Claim 9) after "a desired" insert -- air-traversing --;

UNITED STATES PATENT AND TRADEMARK OFFICE
CERTIFICATE OF CORRECTION

PATENT NO.       : 7,301,122 B2
APPLICATION NO.  : 10/907522
DATED            : November 27, 2007
INVENTOR(S)      : Paquette et al.

It is certified that error appears in the above-identified patent and that said Letters Patent is hereby corrected as shown below:

Col. 7, lines 34 through 36, delete Claim 11 in its entirety and substitute therefore
-- 11. The spark gap assembly of claim 10 further comprising a heat sink positioned about each of the generally cylindrical shaped bodies and wherein the spark gap assembly is incorporated into a welder. --;

Col. 7, lines 37 through 40, delete Claim 12 in its entirety and substitute therefore
-- 12. The spark gap assembly of claim 7 further comprising a respective heat-dissipating mounting member for each spark gap point and a respective non-conductive set screw to directly engage each spark gap point through the respective heat-dissipating mounting member. --.

Signed and Sealed this

Thirteenth Day of May, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,301,122 B2 |
| APPLICATION NO. | : 10/907522 |
| DATED | : November 27, 2007 |
| INVENTOR(S) | : Paquette et al. |

It is certified that error appears in the above-identified patent and that said Letters Patent is hereby corrected as shown below:

Col. 6, line 65 (Claim 1), delete "a body having a first end and a second end;" and substitute therefore -- a body having a first end, a second end, and a longest axis therebetween, the body being free of apertures; and --;

Col. 7, line 4 (Claim 2), before the period, insert -- , the desired spark gap defining a distance for sparking without aid of a gas fill. --;

Col. 7, line 8, (Claim 3), delete "a longitudinal" and substitute therefore -- the longest --;

Col. 7, line 16, (Claim 7), after "a base;" delete "and";

Col. 7, line 19, (Claim 7), before the period, insert -- ; and wherein the pair of single-headed spark gap points each have an oppositely opposing end having a bore therein, the bore configured to directly receive a power input thereto. --;

Col. 7, lines 21 through 23, delete Claim 8 in its entirety and substitute therefore -- 8. The spark gap assembly of claim 7 further comprising a securing member configured to individually secure the at least one double-headed spark gap points to the base and to align electrodes of the at least one double-headed spark gap point with electrodes of the pair of single-headed spark gap points. --;

Col. 7, line 27, (Claim 9) after "a desired" insert -- air-traversing --;

UNITED STATES PATENT AND TRADEMARK OFFICE
CERTIFICATE OF CORRECTION

PATENT NO. : 7,301,122 B2
APPLICATION NO. : 10/907522
DATED : November 27, 2007
INVENTOR(S) : Paquette et al.

It is certified that error appears in the above-identified patent and that said Letters Patent is hereby corrected as shown below:

Col. 7, lines 34 through 36, delete Claim 11 in its entirety and substitute therefore
-- 11. The spark gap assembly of claim 10 further comprising a heat sink positioned about each of the generally cylindrical shaped bodies and wherein the spark gap assembly is incorporated into a welder. --;

Col. 7, lines 37 through 40, delete Claim 12 in its entirety and substitute therefore
-- 12. The spark gap assembly of claim 7 further comprising a respective heat-dissipating mounting member for each spark gap point and a respective non-conductive set screw to directly engage each spark gap point through the respective heat-dissipating mounting member. --.

This certificate supersedes the Certificate of Correction issued May 13, 2008.

Signed and Sealed this

Tenth Day of June, 2008

JON W. DUDAS
*Director of the United States Patent and Trademark Office*